United States Patent
Hu et al.

(10) Patent No.: US 12,476,514 B2
(45) Date of Patent: Nov. 18, 2025

(54) MOTOR SHAFT, MOTOR, AND ELECTRIC VEHICLE

(71) Applicant: Huawei Digital Power Technologies Co., Ltd., Shenzhen (CN)

(72) Inventors: Xiong Hu, Shenzhen (CN); Xueyu Mei, Shanghai (CN); Zhengyi Tang, Shenzhen (CN); Senlin Ma, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 228 days.

(21) Appl. No.: 18/348,658

(22) Filed: Jul. 7, 2023

(65) Prior Publication Data
US 2023/0353006 A1    Nov. 2, 2023

Related U.S. Application Data

(63) Continuation of application No. PCT/CN2022/071399, filed on Jan. 11, 2022.

(30) Foreign Application Priority Data

Jan. 15, 2021  (CN) ......................... 202120118966.0

(51) Int. Cl.
| | |
|---|---|
| *H02K 5/16* | (2006.01) |
| *B60L 50/60* | (2019.01) |
| *H02K 5/173* | (2006.01) |
| *H02K 7/00* | (2006.01) |
| *H02K 7/08* | (2006.01) |
| *F16C 19/06* | (2006.01) |

(52) U.S. Cl.
CPC ............. *H02K 5/1732* (2013.01); *B60L 50/60* (2019.02); *H02K 7/003* (2013.01); *H02K 7/083* (2013.01); *F16C 19/06* (2013.01); *F16C 2380/26* (2013.01)

(58) Field of Classification Search
CPC ...... H02K 5/1732; H02K 7/003; H02K 7/083; B60L 50/60
See application file for complete search history.

(56) References Cited

U.S. PATENT DOCUMENTS 9,726,182 B2 *  8/2017  Kanazawa .............. F04D 13/06

FOREIGN PATENT DOCUMENTS

| CN | 201013765 Y | 1/2008 | |
| CN | 101521426 * | 9/2009 | ............... H02K 5/16 |
| CN | 101521426 A | 9/2009 | |

(Continued)

*Primary Examiner* — Terrance L Kenerly
(74) *Attorney, Agent, or Firm* — Maier & Maier, PLLC

(57) ABSTRACT

A motor shaft, a motor, and an electric vehicle. The motor shaft includes a shaft body and an insulation coating. The shaft body includes a first mounting portion and a second mounting portion that are connected by fastening. A positioning step surface is disposed at an end that is of the first mounting portion and that is close to the second mounting portion. The first mounting portion is configured to mount a rotor. The second mounting portion is covered with the insulation coating, and the second mounting portion is configured to mount a bearing. A resistivity of the insulation coating is not less than $10^7$ Ω·m. In this way, a possibility that a shaft current is generated when a shaft voltage discharges and breaks down a lubricating oil film in the bearing to form a path can be effectively reduced.

18 Claims, 5 Drawing Sheets

(56) References Cited

FOREIGN PATENT DOCUMENTS

| | | | |
|---|---|---|---|
| CN | 202914514 U | 5/2013 | |
| CN | 105564348 | * 5/2016 | ............ B60W 10/22 |
| CN | 205647136 U | 10/2016 | |
| CN | 208241479 U | 12/2018 | |
| CN | 105811644 B | 1/2019 | |
| CN | 208782618 U | 4/2019 | |
| CN | 214506787 U | 10/2021 | |
| JP | 2000156952 A | 6/2000 | |
| JP | 2008280777 A | 11/2008 | |

* cited by examiner

MOTOR SHAFT, MOTOR, AND ELECTRIC VEHICLE

CROSS-REFERENCE TO RELATED APPLICATIONS

This application is a continuation of International Application No. PCT/CN2022/071399, filed on Jan. 11, 2022, which claims priority to Chinese Patent Application No. 202120118966.0, filed on Jan. 15, 2021. The disclosures of the aforementioned applications are hereby incorporated by reference in their entireties.

TECHNICAL FIELD

The embodiments relate to the field of motor technologies and to a motor shaft, a motor, and an electric vehicle.

BACKGROUND

A motor is mainly formed by a stator, a rotor, a motor housing, a motor shaft, and a bearing. The rotor is mounted on the motor shaft, and the motor shaft is connected to the motor housing through the bearing. The motor shaft and the rotor form a rotor component that is rotatable around a central axis of the motor shaft. The stator and the motor housing form a stator component. During operation of the motor, a magnetic circuit or a phase current between the stator component and the rotor component generates a rotating system flux linkage due to imbalance. When the motor shaft rotates, the flux linkage generates an electric potential difference between the rotor component and the stator component, and a shaft voltage is formed.

A shaft current is generated when the shaft voltage passes through the rotor component, the stator component, the bearing, and the like, to form a closed loop. If the shaft voltage is high, or a lubricating oil film in the bearing is not stable at a moment of motor startup, the shaft voltage discharges and breaks down the lubricating oil film in the bearing to form a path, and the shaft current is generated. High temperature produced by partial discharging of the shaft current can melt the bearing, in other words, electric corrosion is generated. The electric corrosion of the bearing increases noise and vibration during operation of the motor, and likely cause damage to the bearing and lubricant aging, resulting in premature malfunction of the motor.

SUMMARY

Embodiments provide a motor shaft, a motor, and an electric vehicle that can reduce a possibility of electric corrosion of a bearing.

According to a first aspect, the embodiments include a motor shaft, including a shaft body and an insulation coating. The shaft body includes a first mounting portion and a second mounting portion that are connected in a fastened manner connected. A positioning step surface is disposed at an end that is of the first mounting portion and that is close to the second mounting portion. The first mounting portion is configured to mount a rotor, the second mounting portion is covered with the insulation coating, and the second mounting portion is configured to mount a bearing. A resistivity of the insulation coating is not less than $10^7$ Ω·m.

According to the motor shaft provided in the first aspect, because the second mounting portion is covered with the insulation coating with a resistivity not less than $10^7$ ohmm·m (also referred to as Ω·m), a possibility that a shaft current is generated when a shaft voltage discharges and breaks down a lubricating oil film in the bearing to form a path can be effectively reduced. For example, the insulation coating can effectively block circulation of the shaft current between the motor shaft and the bearing, so as to reduce a possibility of electric corrosion of the bearing, further reduce a possibility of abnormal operating noise of the motor due to the electrical corrosion of the bearing, and effectively prolong a service life of the motor. The insulation coating has good insulation performance, a simple structure, is easy to process, and a low cost. In addition, the positioning step surface is used for locating the bearing when the bearing is sleeved on the second mounting portion, thereby improving convenience of assembling the bearing on the motor shaft.

According to the first aspect, in a first implementation of the first aspect, the positioning step surface is covered with the insulation coating. Because the bearing is attached to the positioning step surface when sleeved on the second mounting portion, and the positioning step surface is covered with the insulation coating, all contact surfaces between the shaft body and the bearing are covered with the insulation coating, thereby further reducing a possibility of electric corrosion of the bearing.

According to the first aspect or the first implementation of the first aspect, in a second implementation of the first aspect, the second mounting portion of the shaft body is further provided with an annular groove extending along a circumferential direction of the second mounting portion, and the groove is located at an end that is of the second mounting portion and that is close to the positioning step surface. The groove is used for improving the precision of size matching between the motor shaft and the bearing. The circumferential direction of the second mounting portion refers to an axial direction around the second mounting portion.

According to the first aspect or the first implementation and the second implementation of the first aspect, in a third implementation of the first aspect, the groove includes a first connection wall and a second connection wall that are oppositely disposed. The first connection wall is disposed at an end that is of the groove and that is close to the first mounting portion. The insulation coating on the positioning step surface is flush with the first connection wall, and an end surface of an end that is of the insulation coating on the second mounting portion and that is close to the first mounting portion is flush with the second connection wall. In other words, an inner wall of the groove is exposed outside the insulation coating. The groove is a blade clearance groove, which facilitates a cutting tool to perform processing to form a mounting surface (such as, a bearing mounting surface) of the bearing on a peripheral wall of the second mounting portion, and facilitates machining of the motor shaft.

According to the first aspect or the first implementation to the third implementation of the first aspect, in a fourth implementation of the first aspect, an inner wall of the groove is covered with the insulation coating. Because the insulation coating on the shaft body has a relatively large coverage area, a possibility of electric corrosion of the bearing is further reduced.

According to the first aspect or the first implementation to the fourth implementation of the first aspect, in a fifth implementation of the first aspect, at least a part of an end surface that is of the second mounting portion and that is away from the first mounting portion is covered with the insulation coating, so as to further increase a coverage area of the insulation coating on the shaft body.

According to the first aspect or the first implementation to the fifth implementation of the first aspect, in a sixth implementation of the first aspect, the first mounting portion includes a mounting section and a shaft shoulder that are connected in a fastened manner. An outer diameter of the mounting section is greater than an outer diameter of the shaft shoulder, and the outer diameter of the shaft shoulder is greater than an outer diameter of the second mounting portion, to form the positioning step surface. The first mounting portion includes the mounting section and the shaft shoulder, so that the shaft shoulder can increase the strength of the motor shaft and facilitate the mounting of the bearing.

According to the first aspect or the first implementation to the sixth implementation of the first aspect, in a seventh implementation of the first aspect, the mounting section is provided with a rotor mounting groove extending along an axial direction of the mounting section, and is configured to mount the rotor. In this way, convenience of mounting the rotor on the motor shaft is improved.

According to the first aspect or the first implementation to the seventh implementation of the first aspect, in an eighth implementation of the first aspect, a thickness of the insulation coating ranges from 0.01 mm to 0.8 mm.

According to the first aspect or the first implementation to the eighth implementation of the first aspect, in a ninth implementation of the first aspect, a minimum insulation resistance of the insulation coating under a 1000 V direct current voltage is 50 MΩ.

According to a second aspect, the embodiments include a motor, including the motor shaft, the rotor, the stator, the motor housing, and the bearing according to the first aspect or the first implementation to the sixth implementation of the first aspect. The rotor is sleeved by fastening on the first mounting portion of the motor shaft, the stator is sleeved on the rotor, and the motor housing is sleeved by fastening outside the stator. The bearing is sleeved on the second mounting portion of the motor shaft and is connected by fastening to the motor housing. The bearing abuts against the positioning step surface. The motor shaft is rotatable with the rotor relative to the stator.

According to a third aspect, the embodiments include an electric vehicle, including a power supply system and an electric drive assembly. The power supply system is configured to provide electric energy for the electric drive assembly, and the electric drive assembly includes the motor according to the second aspect.

DETAILED DESCRIPTION OF EMBODIMENTS

To make the objectives, solutions, and advantages clearer, the following further describes embodiments in detail with reference to the accompanying drawings.

An electric vehicle includes a battery electric vehicle (BEV,), a hybrid electric vehicle (HEV,), and a plug-in hybrid electric vehicle (PHEV,).

The BEV includes a motor. An energy source of the motor is a power battery. The power battery of the BEV can be recharged from an external power grid. The power battery of the BEV is actually a unique source of in-vehicle energy for vehicle propulsion.

The HEV includes an internal combustion engine and a motor. An energy source of the engine is fuel, and an energy source of the motor is a power battery. The engine is a main source of energy for vehicle propulsion, and the power battery of the HEV provides supplementary energy for vehicle propulsion (the power battery of the HEV electrically buffers fuel energy and recovers kinetic energy).

The PHEV differs from the HEV in that a power battery of the PHEV has a larger capacity than the power battery of the HEV, and the power battery of the PHEV can be recharged from a power grid. The power battery of the PHEV is a main source of energy for vehicle propulsion until a loss of the power battery of the PHEV reaches a low energy level. In this case, the PHEV operates as the HEV for vehicle propulsion.

The following describes embodiments with reference to the accompanying drawings. In the embodiments, a structure of an electric vehicle is described by using a BEV as an example.

Figure 1:
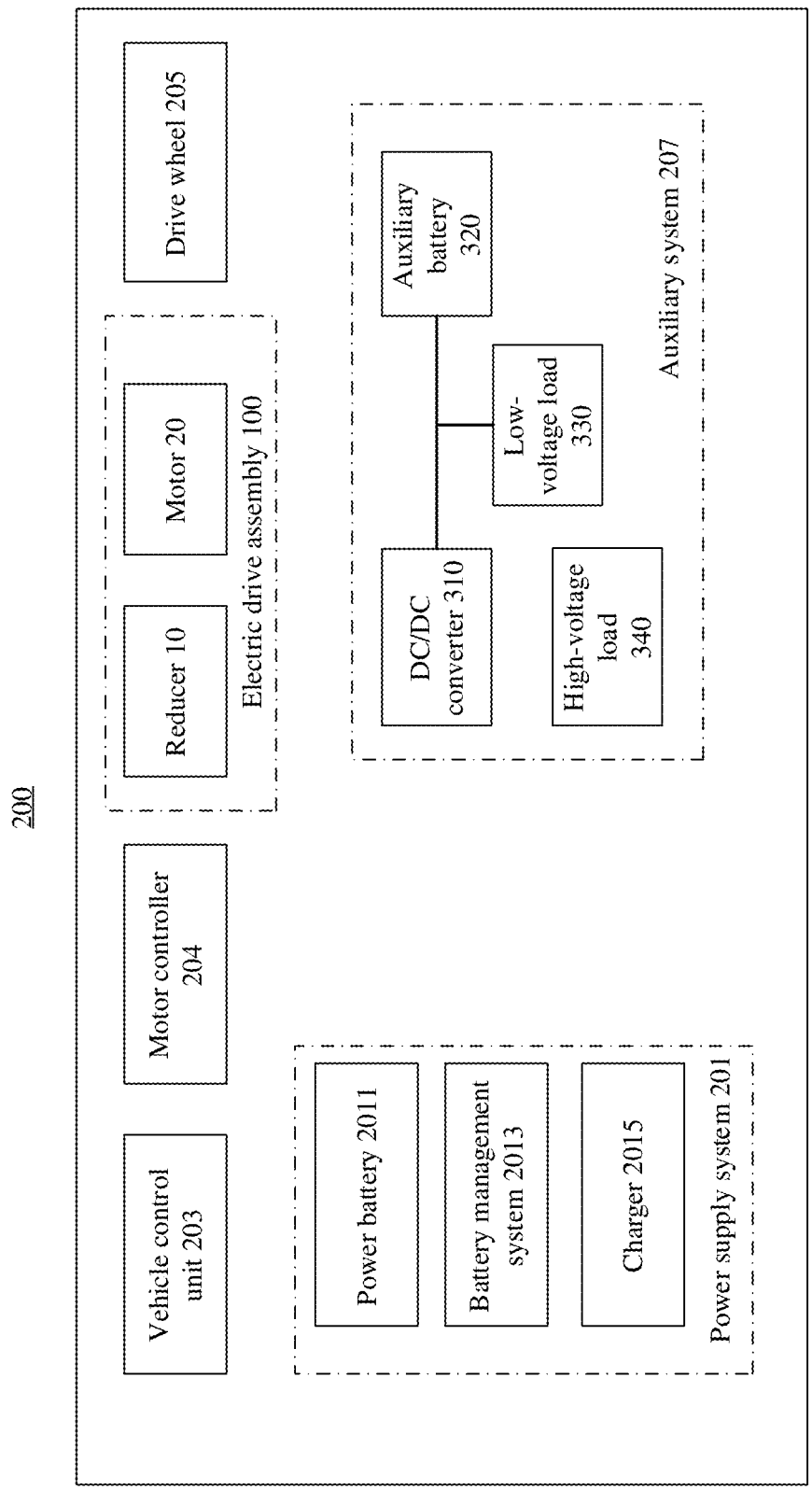
FIG. 1 is a block diagram of a structure of an electric vehicle according to an implementation.

Refer to FIG. 1. An electric vehicle 200 provided in an implementation includes a power supply system 201, an electric drive assembly 100, a vehicle control unit 203, a motor controller 204, a drive wheel 205, and an auxiliary system 207. The power supply system 201 includes a power battery 2011, a battery management system 2013, and a charger 2015. The electric drive assembly 100 includes a motor 20 and a reducer 10 mechanically connected to the motor 20. The reducer 10 is further mechanically connected to the drive wheel 205, and is configured to transfer power generated by the motor 20 to the drive wheel 205 to drive the electric vehicle 200 to travel.

The vehicle controller (VCU or Vehicle Control Unit) 203 is also referred to as a power assembly controller, is a core control component of the entire vehicle, and is equivalent to a brain of the vehicle. After collecting an accelerator pedal signal, a brake pedal signal, and other component signals and making corresponding determining, the VCU controls actions of lower-layer component controllers, to drive the vehicle to normally travel. As a command and management center of the vehicle, main functions of the VCU include drive torque control, brake energy optimization control, vehicle energy management, CAN (controller area network) network maintenance and management, fault diagnosis and processing, vehicle status monitoring, and the like. The VCU controls operation of the vehicle. Therefore, performance of the VCU directly determines stability and safety of the vehicle.

The motor controller 204 is an integrated circuit that actively works to control the motor 20 in the electric drive assembly 100 to work based on a specified direction, speed, angle, and response time, and is communicatively connected to the VCU 203. In the electric vehicle 200, the motor controller 204 is configured to convert, based on an instruction of a gear, a throttle, a brake, or the like, electric energy stored in the power battery 2011 into electric energy needed for the motor, to control a traveling status such as startup and operation, a forward/backward speed, or a climbing force of the electric vehicle 200, or help the electric vehicle 200 brake and store some brake energy in the power battery 2011.

The motor 20 is an electromagnetic apparatus that implements electric energy conversion or transfer based on an electromagnetic induction law, and is electrically connected to the motor controller 204 and mechanically connected to the reducer 10. The motor is configured to generate a drive torque as a power source of the drive wheel 205.

The power battery 2011 is electrically connected to the motor controller 204, and is configured to store and provide electric energy. The power battery 2011 includes, but is not limited to, a lead-acid battery, a lithium iron phosphate battery, a nickel-hydrogen battery, a nickel-cadmium battery, and the like. In some embodiments, the power battery 2011 may alternatively include a supercapacitor.

The battery management system 2013 is electrically connected to the power battery 2011, and is communicatively connected to the VCU 203. The battery management system 2013 is configured to monitor and estimate statuses of the power battery 2011 in different working conditions, to improve utilization of the power battery 2011, and prevent the power battery 2011 from being overcharged or overdischarged, thereby prolonging a service life of the power battery 2011. for example, main functions of the battery management system 2013 may include real-time battery physical parameter monitoring, battery status estimation, online diagnosis and warning, charging, discharging, and pre-charging control, balancing management and heat management, and the like.

The charger 2015 is electrically connected to the power battery 2011, and is configured to be connected to an external power supply to charge the power battery 2011. For example, when the electric vehicle 200 is connected to an external power supply (such as a charging pile), the charger 2015 converts an alternating current provided by the external power supply into a direct current, to charge the power battery 2011. In addition, the battery management system 2013 is further connected to the charger 2015 to monitor a charging process of the power battery 2011.

The auxiliary system 207 includes a DC/DC converter 310, an auxiliary battery 320, a low-voltage load 330, and a high-voltage load 340. An end of the DC/DC converter 310 is connected to the power battery 2011, and the other end of the DC/DC converter 310 is connected to both the auxiliary battery 320 and the low-voltage load 330. The DC/DC converter 310 is configured to: after converting a high voltage (such as 380 V) output by the power battery 2011 into a low voltage (such as 12 V), charge the auxiliary battery 320 and supply power to the low-voltage load 330. In some implementations, the low-voltage load 330 includes low-voltage vehicle accessories such as a cooling pump, a fan, a heater, a power steering apparatus, and a brake. Further, the auxiliary battery 320 may also supply power to the low-voltage load 330. In addition, the power battery 2011 is further connected to the high-voltage load 340 to supply power to the high-voltage load 340. In some implementations, the high-voltage load 340 includes a PTC heater, an air conditioning unit, and the like.

It should be noted that electronic modules in the electric vehicle 200 may communicate with each other by using one or more vehicle networks. The vehicle network may include a plurality of channels for communication. A channel of the vehicle network may be, for example, a serial bus of a controller area network (CAN). One of the channels of the vehicle network may include Ethernet defined by the Institute of Electrical and Electronics Engineers (IEEE) 802 standard family. Other channels of the vehicle network may include a discrete connection between modules and may include a power signal from the auxiliary power battery 2011. Different signals may be transmitted by using different channels of the vehicle network. For example, a video signal may be transmitted by using a high-speed channel (such as Ethernet), and a control signal may be transmitted by using a CAN or a discrete signal. The vehicle network may include any hardware component and software component assisting in signal and data transmission between modules. The vehicle network is not shown in FIG. 1, but it may be implied that the vehicle network may be connected to any electronic module in the electric vehicle 200. For example, the vehicle network may exist in the VCU 203 to coordinate operations of the components.

It may be understood that the schematic structure in the embodiments constitutes no limitation on the electric vehicle 200. In some other embodiments, the electric vehicle 200 may include more or fewer components than those shown in the figure, combine some components, split some components, or have different component arrangements. The components shown in the figure may be implemented by hardware, software, or a combination of software and hardware.

Figure 2:
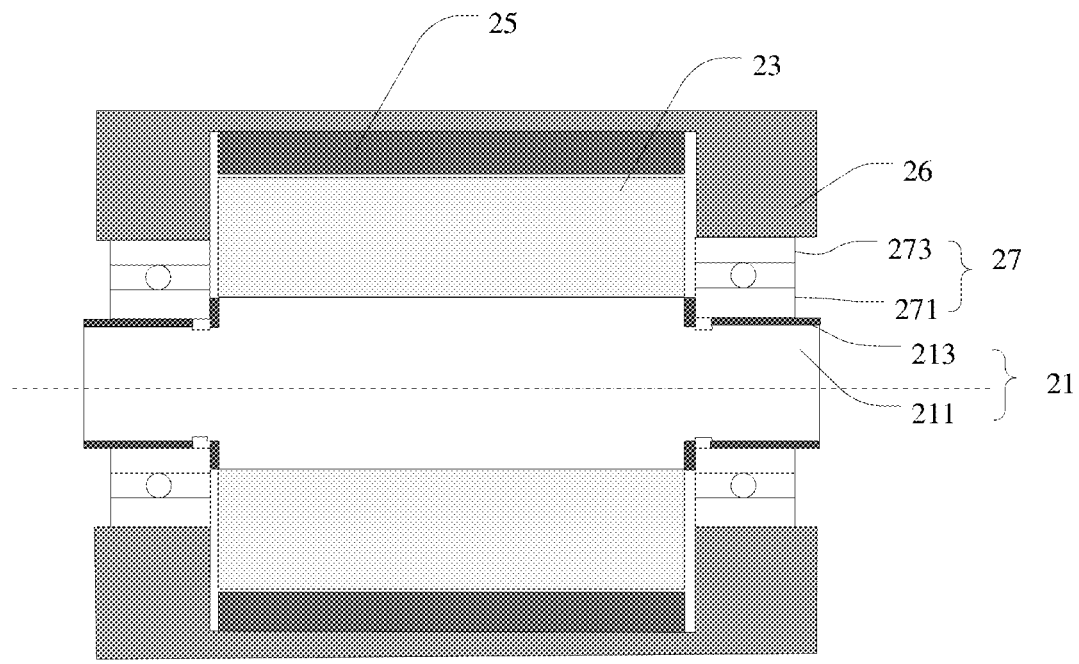
FIG. 2 is a schematic diagram of a motor of an electric vehicle according to an implementation.

Referring to FIG. 2, a motor 20 includes a motor shaft 21, a rotor 23, a stator 25, a motor housing 26, and a bearing 27. The rotor 23 is sleeved by fastening on the motor shaft 21, and the stator 25 is sleeved on the rotor 23. The motor housing 26 is sleeved by fastening on the stator 25, and is configured to accommodate the motor shaft 21, the rotor 23, and the stator 25. The motor shaft 21 is rotatable with the rotor 23 relative to the stator 25. The bearing 27 is sleeved on an end portion of the motor shaft 21 and is fastened to the motor housing 26, and is configured to support the motor shaft 21. The bearing 27 includes an inner ring 271 and an outer ring 273 that are rotatable relative to each other. The inner ring 271 is fastened to the motor shaft 21, and the outer ring 273 is fastened to the motor housing 26.

Figure 3:
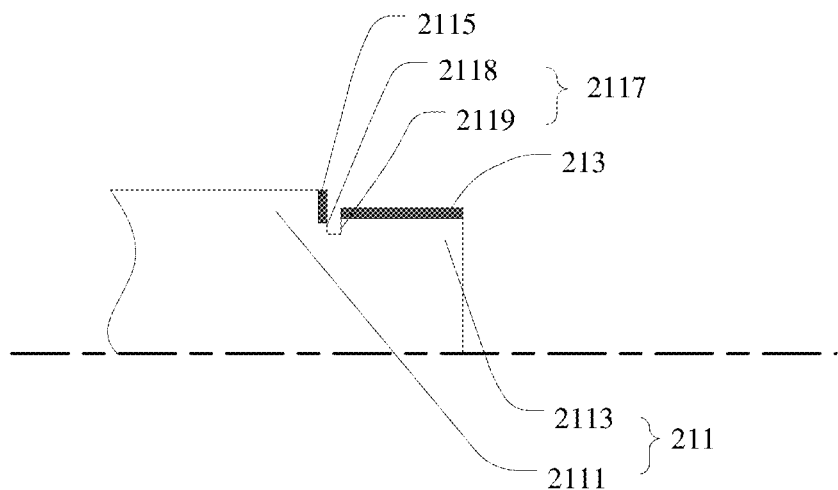
FIG. 3 is a schematic diagram of a partial structure of a motor shaft of the motor shown in FIG. 2.

Referring to FIG. 3, the motor shaft 21 includes a shaft body 211 and an insulation coating 213. The shaft body 211 includes a first mounting portion 2111 and a second mounting portion 2113 that are connected by fastening. The second mounting portion 2113 is located at an end portion of the shaft body 211. A positioning step surface 2115 is disposed at an end that is of the first mounting portion 2111 and that is close to the second mounting portion 2113. The second mounting portion 2113 is covered with the insulation coating 213. A resistivity of the insulation coating 213 is not less than $10^7$ $\Omega \cdot m$. The rotor 23 is sleeved by fastening on the first mounting portion 2111. The inner ring 271 of the bearing 27 is sleeved on the second mounting portion 2113 and is in contact with the positioning step surface 2115. The positioning step surface 2115 is configured to contact the bearing 27 when the bearing 27 is assembled on the second mounting portion 2113, so as to limit a position of the inner ring 271 of the bearing 27, to facilitate assembly of the bearing 27 on the motor shaft 21. It may be understood that a position of the second mounting portion 2113 on the shaft body 211 is not limited in the embodiments. For example, the second mounting portion 2113 is located in the middle of the shaft body 211.

The motor shaft 21 and the rotor 23 form a rotor component that is rotatable around a central axis of the motor shaft 21, and the stator 25 and the motor housing 26 form a stator component. The bearing 27 has lubricating oil inside, to improve smoothness of relative rotation between the inner ring 271 of the bearing 27 and the outer ring 273 of the bearing 27.

During operation of the motor, a magnetic circuit or a phase current between the stator and the rotor generates a rotating system flux linkage due to imbalance. When the motor shaft rotates, the flux linkage generates an electric potential difference between the rotor component and the stator component, forming a shaft voltage. A shaft current is generated when the shaft voltage passes through the rotor component, the stator component, the bearing or an auxiliary apparatus, and the like, to form a closed loop. If the shaft voltage is high, or a lubricating oil film in the bearing is not stable at a moment of motor startup, the shaft voltage discharges and breaks down the lubricating oil film in the bearing to form a path, and consequently, the shaft current is generated. Partial discharging of the shaft current produces high temperature that can melt at least part of the bearing, such as the inner ring, the outer ring, or a ball of the bearing, or contribute to electrical corrosion of the bearing. The electric corrosion of the bearing increases noise and vibration during operation of the motor, and likely cause damage to the bearing and lubricant aging, resulting in premature malfunction of the motor. Operating power of an electric vehicle is usually greater than 100 kw, which causes a large shaft voltage generated by the motor, and therefore causes a high risk of the bearing mounted on the shaft body.

In the motor 20 provided in this implementation, the second mounting portion 2113 is covered with the insulation coating 213 whose resistivity is not less than $10^7$ ohm·m (also referred to as Ω·m). In other words, the insulation coating 213 can withstand a large shaft voltage. This effectively reduces a possibility that the shaft voltage discharges and breaks down the lubricating oil film in the bearing 27 to form a path, and further generates the shaft current. The insulation coating 213 can effectively block circulation of the shaft current between the motor shaft 21 and the bearing 27, so as to reduce a possibility of abnormal operating noise of the motor 20 due to electrical corrosion of the bearing 27, and effectively prolong a service life of the motor 20. In addition, the insulation coating 213 has good insulation performance, a simple structure, is easy to process, and a low cost.

The insulation coating 213 is formed by spraying an insulation material on a surface of the shaft body 211. In this implementation, a thickness of the insulation coating 213 ranges from 0.01 mm to 0.8 mm, and a minimum insulation resistance of the insulation coating 213 under a 1000 V direct current voltage is 50 megohms (also referred to as MΩ). The insulation material includes, but is not limited to, insulation ceramics, Teflon™, and other insulation materials and special insulation materials.

In this implementation, an outer diameter of the first mounting portion 2111 is greater than an outer diameter of the second mounting portion 2113, so that the positioning step surface 2115 is formed at an end portion that is of the first mounting portion 2111 and that is close to the second mounting portion 2113. The positioning step surface 2115 is covered with the insulation coating 213, so that all contact surfaces between the shaft body 211 and the bearing 27 are covered with the insulation coating 213, thereby further reducing a possibility of electrical corrosion the bearing 27. It may be understood that the rotor 23 may be secured to the first mounting portion 2111 by using a fastener, an interference fit, or the like.

In this implementation, there are two second mounting portions 2113. The two second mounting portions 2113 are connected by fastening to two end portions of the first mounting portion 2111 in a one-to-one correspondence. One second mounting portion 2113 is connected to an input shaft (not shown in the figure) of the reducer 10, and an output shaft of the reducer 10 is connected to the drive wheel 205, so as to transfer power generated by the motor 20 to the drive wheel 205.

The second mounting portion 2113 is further provided with an annular groove 2117 extending along a circumferential direction of the second mounting portion 2113, and the groove 2117 is located at an end that is of the second mounting portion 2113 and that is close to the first mounting portion 2111. The groove 2117 is used for improving the precision of size matching between the motor shaft 21 and the bearing 27. The inner wall of the groove 2117 is not covered with the insulation coating 213. For example, the inner wall of the groove 2117 is exposed outside the insulation coating 213. In this implementation, the groove 2117 is a blade clearance groove, which facilitates a cutting tool to perform processing (for example, grinding) to form a mounting surface (such as, a bearing mounting surface) of the bearing 27 on a peripheral wall of the second mounting portion 2113 and then to be cleared.

Figure 4:
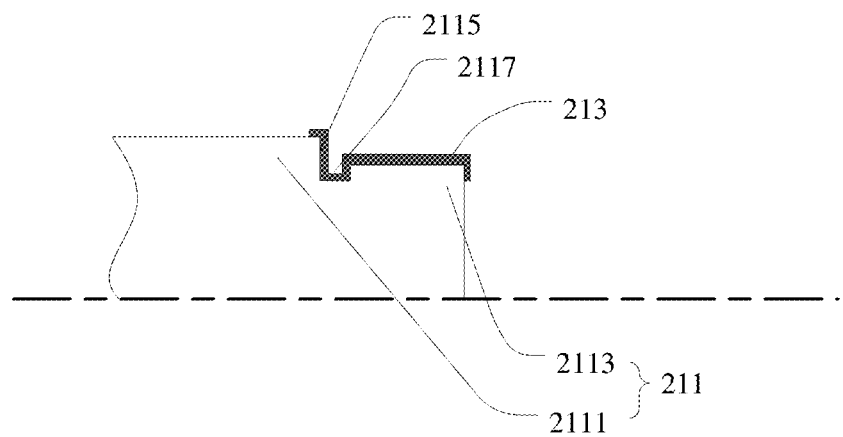
FIG. 4 is a schematic diagram of a partial structure of a motor shaft according to another implementation.

The groove 2117 includes a first connection wall 2118 and a second connection wall 2119 that are oppositely disposed, the first connection wall 2118 is disposed at an end that is of the groove 2117 and that is close to the first mounting portion 2111, the insulation coating 213 on the positioning step surface 2115 is flush with the first connection wall 2118, and an end surface of an end that is of the insulation coating 213 on the second mounting portion 2113 and that is close to the first mounting portion 2111 is flush with the second connection wall 2119. It should be noted that a coverage surface (such as a spraying range of an insulation material) of the insulation coating 213 of the motor shaft 21 includes, but is not limited to, contact surfaces between the motor shaft 21 and the bearing 27. For example, refer to FIG. 4. At least an edge part of an end surface (such as an end surface of the shaft body 211) that is of the second mounting portion 2113 and that is away from the first mounting portion 2111 is covered with the insulation coating 213, and the inner wall of the groove 2117 is covered with the insulation coating 213, so as to increase a coverage area of the insulation coating 213 on the shaft body 211. Alternatively, at least a part of an outer surface of the first mounting portion 2111 may be covered with the insulation coating 213. For example, contact surfaces between the motor shaft 21 and the rotor 23 may also be covered with the insulation coating 213.

Figure 5:
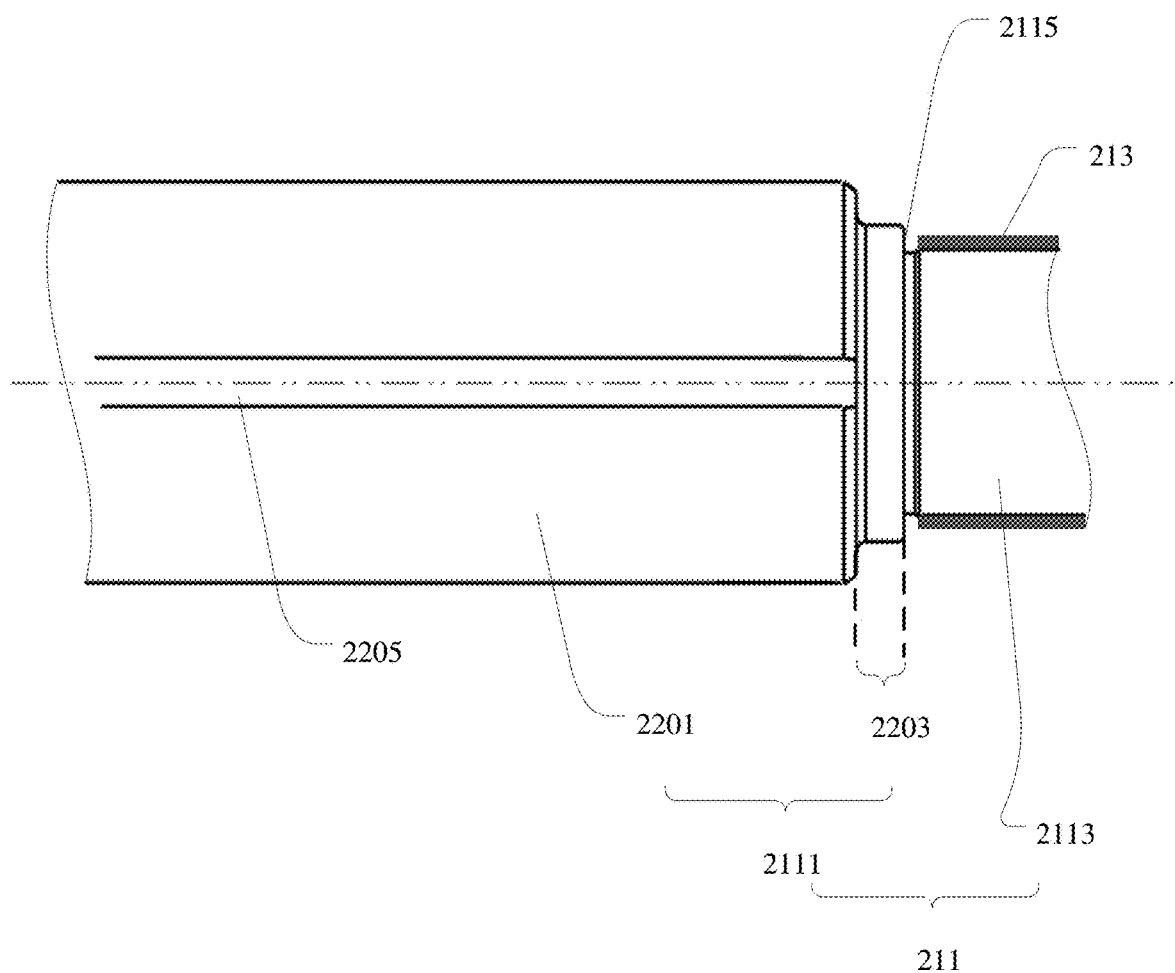
FIG. 5 is a schematic diagram of a structure of a motor shaft according to still another implementation.
Figure 6:
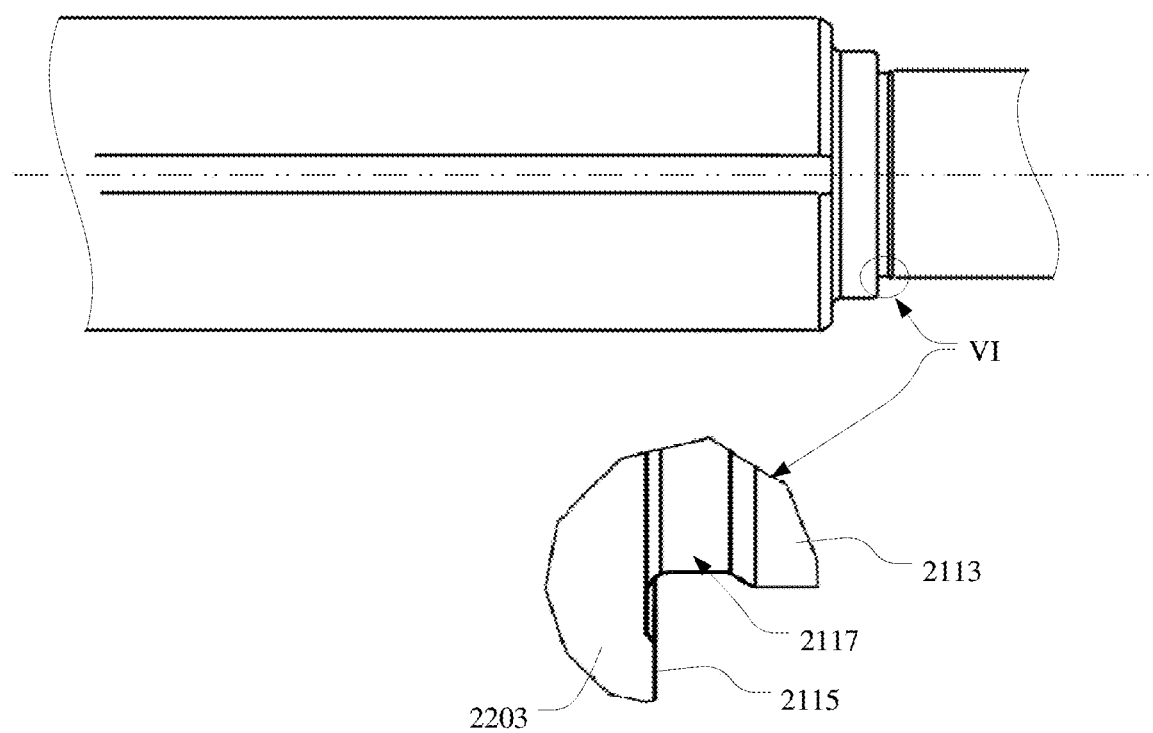
FIG. 6 is an enlarged schematic diagram of a shaft body of the motor shaft and a region IV of the shaft body shown in FIG. 5.

It may be understood that a structure of the first mounting portion 2111 is not limited. For example, in an implementation, refer to FIG. 5 and FIG. 6. The shaft body 211 includes the first mounting portion 2111 and the second mounting portion 2113 that is connected by fastening to an end portion of the first mounting portion 2111. The first mounting portion 2111 includes a mounting section 2201 and a shaft shoulder 2203 that are connected by fastening. An outer diameter of the mounting section 2201 is greater than an outer diameter of the shaft shoulder 2203, and an outer diameter of the shaft shoulder 2201 is greater than an outer diameter of the second mounting portion 2113, to form the positioning step surface 2115. The shaft shoulder 2203 can increase the strength of the motor shaft and facilitate the mounting of the bearing. The mounting section 2201 is provided with a rotor mounting groove 2205 extending along an axial direction of the mounting section 2201, and is configured to mount the rotor. In this way, convenience of mounting the rotor on the motor shaft is improved. The groove 2117 is disposed close to the positioning step surface 2115. The second mounting portion 2113 is covered with the insulation coating 213.

It should be understood that expressions such as "include" and "may include" that may be used indicate existence of the function, operation, or constituent element, and do not limit one or more additional functions, operations, and constituent elements. Terms such as "include" and/or "have" may be construed as a particular characteristic, quantity, operation, constituent element, or component, or a combination thereof, but cannot be construed as excluding the existence or possible addition of one or more other characteristics, quantities, operations, constituent elements, or components, or combinations thereof.

In addition, the expression "and/or" includes any and all combinations of words listed in association. For example, the expression "A and/or B" may include A, may include B, or may include both A and B.

Expressions including ordinal numbers such as "first" and "second" may modify elements. However, such elements are not limited by the expressions. For example, the expressions do not limit the order and/or importance of the elements. The expression is used only to distinguish one element from another. For example, first user equipment and second user equipment indicate different user equipment, although both the first user equipment and the second user equipment are user equipment. Similarly, without departing from the scope of the embodiments, a first element may be referred to as a second element, and similarly, a second element may also be referred to as a first element.

When a component "connects" or "is connected" to another component, it should be understood that the component directly connects or is directly connected to the another component, or a further component may alternatively exist between the component and the another component. In addition, when a component "directly connects" or "directly connected" to another component, it should be understood that there is no component between them.

The foregoing descriptions are merely implementations of the embodiments, but the embodiments are not limited thereto. Any variation or replacement readily figured out by a person skilled in the art n shall fall within the scope of this embodiments.

The invention claimed is:

1. A motor shaft, comprising:
   a shaft body comprising:
      a first mounting portion configured to mount a rotor and
      a second mounting portion configured to mount a bearing, wherein the first mounting portion and the second mounting portion are connected by fastening, a positioning step surface is disposed at an end of the first mounting portion that is close to the second mounting portion, and the second mounting portion is further provided with an annular groove extending along a circumferential direction of the second mounting portion; and
   an insulation coating, wherein the second mounting portion is covered with the insulation coating, an inner wall of the annular groove is not covered with the insulation coating and a resistivity of the insulation coating is not less than $10^7$ Ω·m.

2. The motor shaft according to claim 1, wherein the positioning step surface is covered with the insulation coating.

3. The motor shaft according to claim 2, wherein the annular groove is located at an end of the second mounting portion that is close to the positioning step surface.

4. The motor shaft according to claim 3, wherein the annular groove comprises:
   a first connection wall and a second connection wall that are oppositely disposed, the first connection wall is disposed at an end of the annular groove that is close to the first mounting portion, the insulation coating on the positioning step surface is flush with the first connection wall, and an end surface of an end of the insulation coating on the second mounting portion that is close to the first mounting portion is flush with the second connection wall.

5. The motor shaft according to claim 1, wherein at least a part of an end surface of the second mounting portion that is away from the first mounting portion is covered with the insulation coating.

6. The motor shaft according to claim 1, wherein the first mounting portion comprises a mounting section and a shaft shoulder that are connected by fastening, an outer diameter of the mounting section is greater than an outer diameter of the shaft shoulder, and the outer diameter of the shaft shoulder is greater than an outer diameter of the second mounting portion, to form the positioning step surface.

7. The motor shaft according to claim 6, wherein the mounting section is provided with a rotor mounting groove extending along an axial direction of the mounting section for mounting the rotor.

8. The motor shaft according to claim 1, wherein a thickness of the insulation coating ranges from 0.01 mm to 0.8 mm.

9. The motor shaft of claim 1, wherein a minimum insulation resistance of the insulation coating under a 1000 V direct current voltage is 50 MΩ.

10. A motor, comprising
    a rotor,
    a stator,
    a motor housing,
    a bearing and
    a motor shaft, wherein the motor shaft comprises:
       a shaft body comprising:
          a first mounting portion configured to mount a rotor and
          a second mounting portion configured to mount a bearing, wherein the first mounting portion and the second mounting portion are connected by fastening, a positioning step surface is disposed at an end of the first mounting portion that is close to the second mounting portion, and the second mounting portion is further provided with an annular groove extending along a circumferential direction of the second mounting portion; and
       an insulation coating, wherein the second mounting portion is covered with the insulation coating, an inner wall of the annular groove is not covered with the insulation coating, a resistivity of the insulation coating is not less than $10^7$ Ω·m, the rotor is sleeved by fastening on the first mounting portion of the motor shaft, the stator is sleeved on the rotor, the motor housing is sleeved by the fastening outside the stator, the bearing is sleeved on the second mounting portion of the motor shaft and is connected by the fastening to the motor housing, and the motor shaft is rotatable with the rotor relative to the stator.

11. The motor according to claim 10, wherein the positioning step surface is covered with the insulation coating.

12. The motor according to claim 11, wherein the annular groove is located at an end of the second mounting portion that is close to the positioning step surface.

13. The motor according to claim 12, wherein the annular groove comprises a first connection wall and a second connection wall that are oppositely disposed, the first connection wall is disposed at an end of the annular groove that is close to the first mounting portion, the insulation coating on the positioning step surface is flush with the first connection wall, and an end surface of an end of the insulation coating on the second mounting portion that is close to the first mounting portion is flush with the second connection wall.

14. The motor according to claim 10, wherein at least a part of an end surface of the second mounting portion that is away from the first mounting portion is covered with the insulation coating.

15. The motor according to claim 10, wherein the first mounting portion comprises a mounting section and a shaft shoulder that are connected by fastening, an outer diameter of the mounting section is greater than an outer diameter of the shaft shoulder, and the outer diameter of the shaft shoulder is greater than an outer diameter of the second mounting portion, to form the positioning step surface.

16. The motor according to claim 15, wherein the mounting section is provided with a rotor mounting groove extending along an axial direction of the mounting section for mounting the rotor.

17. The motor according to claim 10, wherein a thickness of the insulation coating ranges from 0.01 mm to 0.8 mm, wherein a minimum insulation resistance of the insulation coating under a 1000 V direct current voltage is 50 MΩ.

18. An electric vehicle, comprising:
a power supply system and
an electric drive assembly, wherein the power supply system is configured to provide electric energy for the electric drive assembly, and the electric drive assembly comprises a motor comprising:
a rotor,
a stator,
a motor housing,
a bearing and
a motor shaft comprising:
a shaft body comprising:
a first mounting portion configured to mount a rotor and
a second mounting portion configured to mount a bearing, wherein the first mounting portion and the second mounting portion are connected by a fastening, a positioning step surface is disposed at an end of the first mounting portion that is close to the second mounting portion, and the second mounting portion is further provided with an annular groove extending along a circumferential direction of the second mounting portion; and
an insulation coating, the second mounting portion is covered with the insulation coating, an inner wall of the annular groove is not covered with the insulation coating, a resistivity of the insulation coating is not less than $10^7$ Ω·m; the rotor is sleeved by fastening on the first mounting portion of the motor shaft, the stator is sleeved on the rotor, the motor housing is sleeved by fastening outside the stator, the bearing is sleeved on the second mounting portion of the motor shaft and is connected by fastening to the motor housing, and the motor shaft is rotatable with the rotor relative to the stator.

* * * * *